(12) United States Patent
Edgar

(10) Patent No.: US 6,393,160 B1
(45) Date of Patent: May 21, 2002

(54) IMAGE DEFECT CORRECTION IN TRANSFORM SPACE

(75) Inventor: Albert D. Edgar, Austin, TX (US)

(73) Assignee: Applied Science Fiction, Austin, TX (US)

( * ) Notice: Subject to any disclaimer, the term of this patent is extended or adjusted under 35 U.S.C. 154(b) by 0 days.

(21) Appl. No.: 09/264,773

(22) Filed: Mar. 9, 1999

Related U.S. Application Data

(60) Provisional application No. 60/077,903, filed on Mar. 13, 1998.

(51) Int. Cl.⁷ .............................. G06K 9/40; G06T 5/00; G06T 5/50
(52) U.S. Cl. .................... 382/275; 382/260; 382/263
(58) Field of Search ............................. 382/275, 260, 382/263, 254; 358/463; 250/330, 559.04, 559.05, 559.06, 559.07, 559.08

(56) References Cited

U.S. PATENT DOCUMENTS

| 4,260,899 A | 4/1981 | Baker |
| 4,301,469 A | 11/1981 | Modeen et al. |

(List continued on next page.)

FOREIGN PATENT DOCUMENTS

| DE | 28 21 868 A1 | 11/1979 | G01N/21/32 |
| DE | 196 36 867 C1 | 1/1998 | H04N/5/21 |
| EP | 1 547 811 | 6/1979 | H04N/3/36 |
| EP | 0 422 220 A1 | 4/1991 | A61B/6/03 |
| EP | 0 482 790 B1 | 4/1992 | H04N/1/40 |
| EP | 0 527 097 A2 | 2/1993 | H04N/1/40 |
| EP | 0 569 142 A1 | 11/1993 | H04N/5/253 |
| EP | 0 624 848 A2 | 11/1994 | G06F/15/68 |
| EP | 0 699 753 A2 | 8/1995 | H04N/1/407 |
| EP | 0 716 538 A2 | 6/1996 | H04N/1/50 |
| EP | 0 751 670 A2 | 1/1997 | H04N/1/10 |
| EP | 0 768 621 A2 | 4/1997 | G06T/5/20 |
| EP | 0 794 454 A2 | 9/1997 | G03B/27/73 |
| EP | 0 816 833 A2 | 1/1998 | G01N/21/88 |
| EP | 0 816 833 A3 | 8/1998 | G01N/21/88 |
| EP | 0 893 914 A1 | 1/1999 | H04N/5/253 |
| GB | 2 283 633 A | 5/1995 | H04N/5/262 |
| JP | 4-291139 | 10/1992 | G01N/21/89 |
| JP | 11185028 | 7/1999 | G06T/1/00 |
| JP | 2000-13604 | 1/2000 | H04N/1/409 |
| JP | 2000-196813 A | 7/2000 | H04N/1/40 |
| WO | WO 84/02019 | 5/1984 | G06F/15/20 |
| WO | WO 89/06890 | 7/1989 | H04N/3/36 |
| WO | WO 90/01240 | 2/1990 | H04N/1/40 |
| WO | WO 91/09493 | 6/1991 | H04N/5/127 |
| WO | WO 92/05469 | 4/1992 | G03B/27/53 |
| WO | WO 95/15530 | 6/1995 | G06F/17/14 |
| WO | WO 97/16028 | 5/1997 | H04N/7/30 |
| WO | WO 98/31142 | 7/1998 | H04N/5/253 |
| WO | WO 98/34397 | 8/1998 | |
| WO | WO 99/40729 | 8/1999 | H04N/9/11 |
| WO | WO 01/48694 | 7/2001 | G06T/5/00 |

OTHER PUBLICATIONS

New Adaptive Vector Filter Based on Noise Estimate, Mei Yu, et al., IEICE Trans Fundamentals, vol. E82, No. 6, Jun., 1999.

(List continued on next page.)

Primary Examiner—Scott Rogers
(74) Attorney, Agent, or Firm—Dinsmore & Shohl LLP

(57) ABSTRACT

Surface defects in a reflection scan of a print made with visible light are corrected by using a scan of the print made with infrared light. In accordance with the present invention, surface defects in a reflection scan of an image consisting of pixels made with visible light are corrected by using a scan of the image consisting of pixels made with infrared light. This correction of surface defects is preformed by first establishing for each pixel an upper and lower bound for defect intensity based on the infrared record. The corresponding visible pixel is then corrected by subtracting the combination of upper and lower bound resulting in a corrected pixel.

24 Claims, 12 Drawing Sheets

U.S. PATENT DOCUMENTS

| | | |
|---|---|---|
| 4,302,108 A | 11/1981 | Timson |
| 4,462,860 A | 7/1984 | Szmanda |
| 4,670,779 A | 6/1987 | Nagano |
| 4,677,465 A | 6/1987 | Alkofer |
| 4,680,638 A | 7/1987 | Childs |
| 4,700,229 A | 10/1987 | Herrmann et al. .......... 356/431 |
| 4,775,238 A | 10/1988 | Weber |
| 4,796,061 A | 1/1989 | Ikeda et al. .................... 355/73 |
| 4,845,551 A | 7/1989 | Matsumoto |
| 4,933,566 A | 6/1990 | Masaaki et al. |
| 4,937,720 A | 6/1990 | Kirchberg |
| 4,969,045 A | 11/1990 | Haruki et al. |
| 4,972,091 A | 11/1990 | Cielo et al. |
| 4,989,973 A | 2/1991 | Noso et al. .............. 356/239.8 |
| 4,994,918 A | 2/1991 | Lingemann |
| 5,003,379 A | 3/1991 | Moore, Jr. et al. |
| 5,010,401 A | 4/1991 | Murakami et al. |
| 5,047,968 A | 9/1991 | Carrington et al. |
| 5,058,982 A | 10/1991 | Katzir |
| 5,091,972 A | 2/1992 | Kwon et al. |
| 5,097,521 A | 3/1992 | Massmann |
| 5,149,960 A | 9/1992 | Dunne et al. ............... 250/226 |
| 5,155,596 A | 10/1992 | Kurtz et al. |
| 5,200,817 A | 4/1993 | Birnbaum |
| 5,266,805 A | 11/1993 | Edgar .......................... 250/330 |
| 5,267,030 A | 11/1993 | Giorgianni et al. ......... 358/527 |
| 5,291,286 A | 3/1994 | Murakami et al. .......... 348/469 |
| 5,311,310 A | 5/1994 | Jozawa et al. .............. 348/416 |
| 5,335,086 A | 8/1994 | Kitamura .................... 358/431 |
| 5,371,542 A | 12/1994 | Pauli et al. .................. 348/262 |
| 5,447,811 A | 9/1995 | Buhr et al. .................... 430/20 |
| 5,448,380 A | 9/1995 | Park ............................ 358/520 |
| 5,452,018 A | 9/1995 | Capitant et al. ............ 348/651 |
| 5,465,155 A | 11/1995 | Edgar .......................... 385/500 |
| 5,465,163 A | 11/1995 | Yoshihara et al. .......... 358/444 |
| 5,477,345 A | 12/1995 | Tse ............................. 358/500 |
| 5,509,086 A | 4/1996 | Edgar et al. ................. 382/167 |
| 5,516,608 A | 5/1996 | Hobbs et al. ................. 430/30 |
| 5,552,904 A | 9/1996 | Ryoo et al. ................. 358/518 |
| 5,561,611 A | 10/1996 | Avinash ...................... 364/553 |
| 5,565,931 A | 10/1996 | Girod .......................... 348/675 |
| 5,568,270 A | 10/1996 | Endo ........................... 358/298 |
| 5,581,376 A | 12/1996 | Harrington .................. 358/518 |
| 5,582,961 A | 12/1996 | Giorgianni et al. ......... 430/508 |
| 5,583,950 A | 12/1996 | Prokoski ..................... 382/212 |
| 5,589,887 A | 12/1996 | Wischermann .............. 348/616 |
| 5,608,547 A | 3/1997 | Nakatani et al. ............ 358/505 |
| 5,641,596 A | 6/1997 | Gray et al. .................... 430/21 |
| 5,666,443 A | 9/1997 | Kumashiro .................. 382/266 |
| 5,673,336 A | 9/1997 | Edgar et al. ................. 382/167 |
| 5,721,624 A | 2/1998 | Kumashiro et al. ......... 358/450 |
| 5,726,773 A | 3/1998 | Mehlo et al. ................ 358/474 |
| 5,729,631 A | 3/1998 | Wober et al. ................ 382/232 |
| 5,771,107 A | 6/1998 | Fujimoto et al. ............ 358/464 |
| 5,808,674 A | 9/1998 | Adams, Jr. et al. .......... 348/273 |
| 5,892,595 A | 4/1999 | Yamakawa et al. ......... 358/530 |
| 5,923,042 A | 7/1999 | Mietta et al. ........... 250/559.06 |
| 5,930,388 A | 7/1999 | Murakami et al. .......... 382/167 |
| 5,963,662 A | 10/1999 | Vachtsevanos et al. ..... 382/150 |
| 5,969,372 A | 10/1999 | Stavely et al. ......... 250/559.42 |
| 5,979,011 A | 11/1999 | Miyawaki et al. ............ 15/308 |
| 5,982,941 A | 11/1999 | Loveridge et al. .......... 382/260 |
| 5,982,951 A | 11/1999 | Katayama et al. .......... 382/284 |
| 5,991,444 A | 11/1999 | Burt et al. ................... 382/232 |
| 6,005,987 A | 12/1999 | Nakamura et al. .......... 382/294 |
| 6,057,040 A | 5/2000 | Hage ........................... 428/447 |
| 6,075,905 A | 6/2000 | Herman et al. .............. 382/284 |
| 6,078,051 A | 6/2000 | Banton et al. ........... 250/341.1 |
| 6,078,701 A | 6/2000 | Hsu et al. .................... 382/294 |
| 6,101,273 A | 8/2000 | Matama ....................... 382/169 |
| 6,128,416 A | 10/2000 | Oura ............................ 382/284 |
| 6,239,886 B1 | 5/2001 | Klasser et al. .............. 358/518 |

OTHER PUBLICATIONS

A Robust Method for Parameter Estimation of Signal–Dependent Noise Models in Digital Images, B. Aiazzi, et al., IEEE, 1997, pp. DSP 97—601–604.

A Regularized Iterative Image Restoration Algorithm, Aggelos K. Katsaggelos, et al., IEEE, 1991, pp. 914–929.

Adaptive Fourier Threshold Filtering: A Method to Reduce Noise and Incoherent Artifacts in High Resolution Cardiac Images, M. Doyle, et al., 8306 Magnetic Resonance in Medicine, May, 31, 1994, No. 5, Baltimore, MD., pp. 546–550.

Anisotropic Spectral Magnitude Estimation Filters for Noise Reduction and Image Enhancement, Til Aach, et al., IEEE, 1996, pp. 335–338.

Adaptive–neighborhood filtering of images corrupted by signal–dependent noise, Rangaraj M. Rangayyan et al., Applied Optics, vol. 37, No. 20, Jul. 10, 1998, pp. 4477–4487.

*Grayscale Characteristics*, Photographic Negatives The Nature of Color Images, pp. 163–168.

*Digital Imaging Equipment White Papers*, Putting Damaged Film on Ice, A Technical Discussion of Advances in Digital Imaging, Nikon Corporation, http://www.nikonusa.com/reference/whitepapers/imaging/ditechdisc.html, Aug. 5, 1999.

Local Cosine Transform—A Method for the Reduction of the Blocking Effect in JPEG, Gil Aharoni, et al., Journal of Mathematical Imaging and Vision, 3, 7–38, 1993.

*Digital ICE*, Applied Science Fiction, Inc., http://www.asf.com/html/o_products/iceprod.html. Aug. 5, 1999.

*About Digital ICE Technology*, Applied Science Fiction, Inc., http://www.asf.com/html/o_products/ictech.html. Aug. 5, 1999.

2–D Adaptive Volterra Filter for 2–D Nonlinear Channel Equalisation and Image Restoration, J.N. Lin, et al., Electronic Letters, vol. 28, No. 2, Jan. 16, 1992, pp. 180–182.

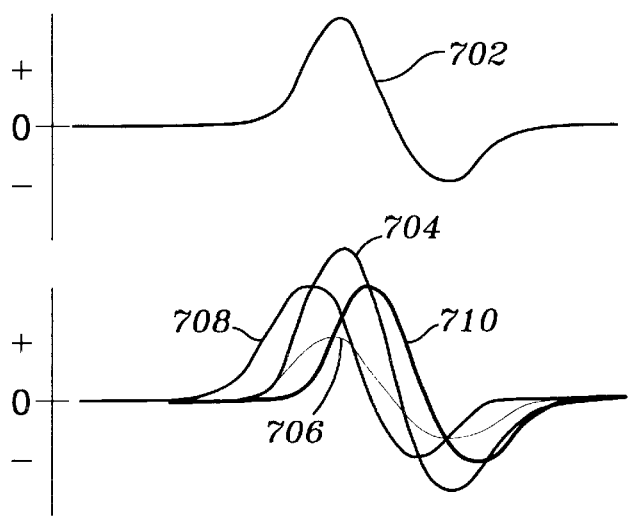
*FIG. 7a*
*FIG. 7b*
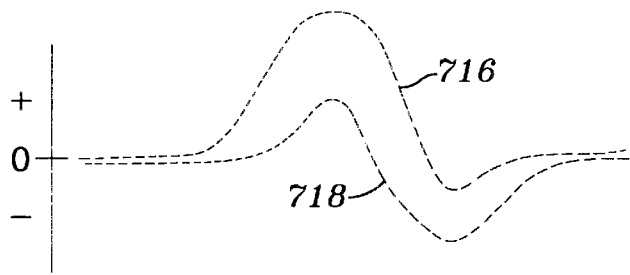
*FIG. 7c*
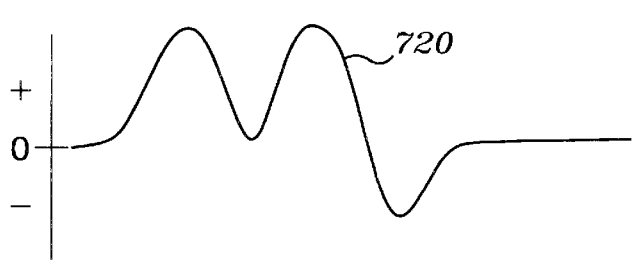
*FIG. 7d*
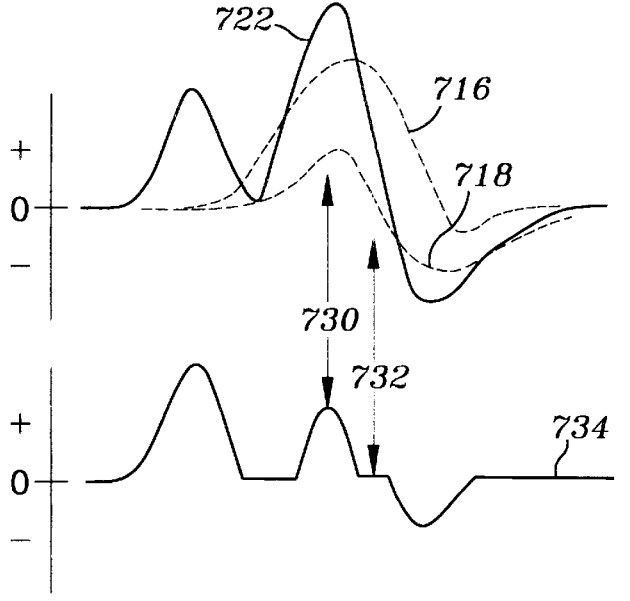
*FIG. 7e*
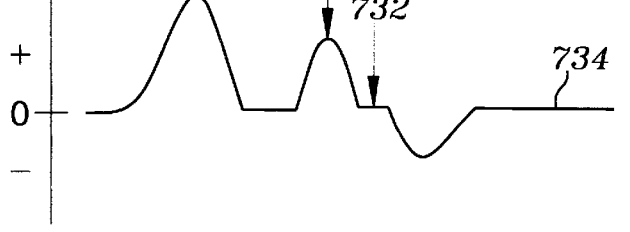
*FIG. 7f*

IMAGE DEFECT CORRECTION IN TRANSFORM SPACE

RELATED APPLICATION

This application relies on U.S. Provisional Application Serial No. 60/077,903 filed Mar. 13, 1998, and entitled "Image Defect Correction in Transform Space."

TECHNICAL FIELD OF INVENTION

This invention relates to electronic scanning of images, and more particularly to the scanning of photographic prints by reflected light and the removal of surface defects.

BACKGROUND OF THE INVENTION

The present invention is an improvement on a method of correcting defects in a film image using infrared light as taught in U.S. Pat. No. 5,266,805 issued to Albert Edgar, the present inventor. The underlying physics enabling this method is illustrated in FIG. 1. In FIG. 1 it is noted that with any color of visible light, such as green light, one or more dyes in a color film absorb light with corresponding low transmission of the light; however, in the infrared wavelength range, the common image forming dyes have a very high transmission approaching 100%, and therefore have little or no effect on transmitted infrared light. On the other hand, most surface defects, such as scratches, fingerprints, or dust particles, degrade the image by refracting light from the optical path. This refraction induced transmission loss is nearly the same in the infrared as it is in the visible, as illustrated in FIG. 1.

Continuing now with FIG. 2, a film substrate 201 has embedded in it a dye layer 202. Infrared light 204 (FIG. 2a) impinging on the film 201 will pass through the film and emerge as light 206 with nearly 100% transmission because the dye 202 does not absorb infrared light. Conversely, visible light 208 (FIG. 2b) will be absorbed by the dye 202. If the dye density is selected for a 25% transmission, then 25% of the visible light 210 will be transmitted by the film 201.

Now assume the film is scratched with a notch 214 (FIG. 2c) such that 20% of the light will be refracted from the optical path before penetrating into the film 201. When a beam of infrared light 216 strikes the film 201, 20% will be diverted due to the notch 214, and a beam of 80% of the infrared light 218 will be transmitted. Finally, let a beam of visible light 220 (FIG. 2d) impinge on the film 201. Again 20% of the light 222 is diverted by the notch 214, leaving 80% of the visible light to penetrate the film 201. However, the dye layer 202 absorbs 75% of that 80%, leaving only 25% of 80%, or 20% of the original light 224, to pass through the film 201.

In general, the beam left undiverted by the defect is further divided by dye absorption. In visible light, that absorption represents the desired image, but in infrared that dye absorption is virtually zero. Thus, by dividing the visible light actually transmitted for each pixel by the infrared light actually transmitted, the effect of the defect is divided out, just like division by a norming control experiment, and the defect is thereby corrected. This division process is further clarified in FIG. 3. The value of a pixel 302 of a visible light image 304 is divided with operator 306 by the value of the corresponding pixel 308 of the infrared light image 310. The resultant value is placed into pixel 312 of the corrected image 314. Typically, the process is repeated with visible image 304 received under blue light, then green light, then red light to generate three corrected images representing the blue, green, and red channels of the image 304.

FIG. 4 is similar to FIG. 3 in that it shows a process for removing the effect of defects from a visible light image 404 using an infrared light image 406. Although the operator 408 in FIG. 4 is a subtraction, FIG. 4 is mathematically identical to FIG. 3 because the same result is obtained either by dividing two numbers, or by taking the logarithm of each, subtracting the two values in the logarithmic space, then taking the inverse logarithm of the result. However, the arrangement of FIG. 4 enables many additional useful functions because within the dotted line 402, the signals from images 404 and 406 may be split and recombined with a variety of linear functions that would not be possible with the nonlinear processing using the division operator of FIG. 3.

For example, in FIG. 5 a visible image 502 and an infrared image 504 are processed by logarithmic function blocks 506 and 508, respectively, to enter the linear processing dotted block 510 equivalent to block 402 of FIG. 4. After processing within block 510 is completed, the antilog is taken at function block 512 to produce the corrected image 514.

Internal to linear processing block 510, the logarithmic versions of the visible and infrared images are divided into high pass and low pass images with function blocks 520, 522, 524, and 526. These function blocks are selected such that when the output of the high and low pass blocks are added, the original input results. Further, the high pass function blocks 522 and 526 are equal, and the low pass function blocks 520 and 524 are equal. Under these assumptions, and under the further temporary assumption that the gain block 530 is unity, the topology in linear block 510 produces a result identical to the single subtraction element 408 for FIG. 4.

Without the logarithmic function blocks 506, 508, and 512, the split frequency topology shown in block 510 would not work. The output of a high pass filter, such as blocks 522 and 526, averages zero because any sustained bias away from zero is a low frequency that is filtered out in a high frequency block. A signal that averages to zero in small regions obviously passes through zero within those small regions. If function block 540 were a division, as would be required without the logarithmic operators, then the high pass visible signal 542 would often be divided by the zero values as the high pass infrared signal 544 passed through zero, resulting in an infinite high pass corrected signal 546, which obviously would give erroneous results. However, as configured with block 540 as a subtraction, the process is seen to avoid this problem.

The split frequency topology of FIG. 5 appears to be a complicated way to produce a mathematically equal result to that produced by the simple topology of FIG. 3 and FIG. 4. However, by separating the high frequencies as shown in FIG. 5, it is possible to overcome limitations in the scanner system by now allowing the gain block 530 to vary from unity. A typical scanner will resolve less detail in infrared light than in visible light. By letting gain block 530 have a value greater than unity, this deficiency can be controlled and corrected.

Often, however, the smudging of detail by a scanner in the infrared region relative to the visible region will vary across the image with focus shifts or the nature of each defect. By allowing the gain block 530 to vary with each section of the image, a much better correction is obtained. In particular, the value of gain is selected such that after subtraction with function block 540, the resulting high frequency signal 546 is as uncorrelated to the high frequency defect signal 548 as possible. If given the task, a human operator would subtract more or less of the defect signal 548 as controlled by turning the "knob" of gain block 530. The human operator would stop when the defect "disappears" from corrected image signal 546 as seen by viewing the corrected image 514. This point is noted by the human operator as "disappearance" of the defect and is mathematically defined as the point at which the defect signal 544 or 548 and the corrected signal 546 are uncorrelated. This process could be repeated for each segment of the image with slightly different values of gain resulting as the optimum gain for each segment.

Despite the flexibility introduced by the gain block 530 of FIG. 5, it has been found that often a defect is incompletely nulled because deficiencies in the scanner cause the defect to look different in the infrared and the visible, such that no setting of gain can eliminate all aspects of the defect.

A need has thus arisen for an improved method for image defect correction.

SUMMARY OF THE INVENTION

In accordance with the present invention, surface defects in a reflection scan of an image consisting of pixels made with visible light are corrected by using a scan of the image consisting of pixels made with infrared light. This correction of surface defects is performed by first establishing for each pixel an upper and lower bound for defect intensity based on the infrared record. The corresponding visible pixel is then corrected by substracting the combination of upper and lower bound resulting in a corrected pixel.

BRIEF DESCRIPTION OF THE DRAWINGS

For a more complete understanding of the present invention and for further advantages thereof, reference is now made to the following Description of the Preferred Embodiments taken in conjunction with the accompanying Drawings in which:

FIGS. 7*a–7f* graphically detail the effect of the bounded subtraction shown in FIG. 6;

DESCRIPTION OF THE PREFERRED EMBODIMENTS

Figure 6:
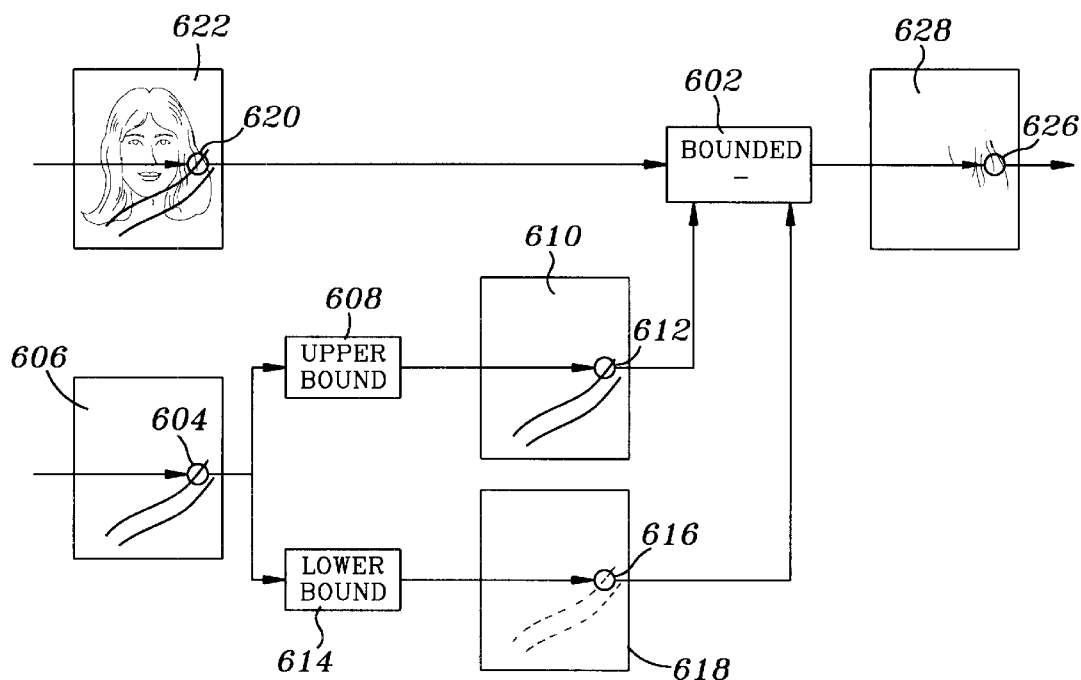
FIG. 6 teaches the present method of bounded subtraction used in surface defect correction.

The topology of FIG. 6 of the present invention seeks to overcome the problem of incompletely nulling a defect by utilizing a bounded subtraction function block 602 capable of totally zeroing a defect within a bounded range.

Figure 1:
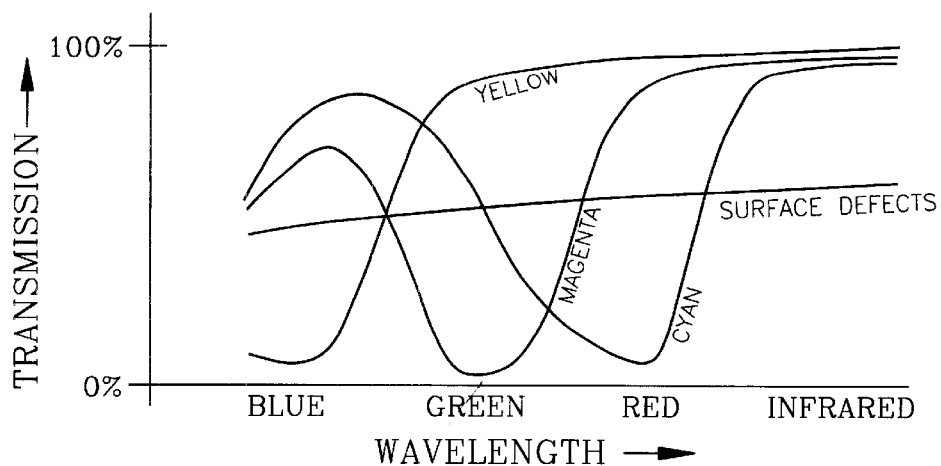
FIG. 1 compares light transmission of dyes with light transmission of a surface defect.
Figure 2A:
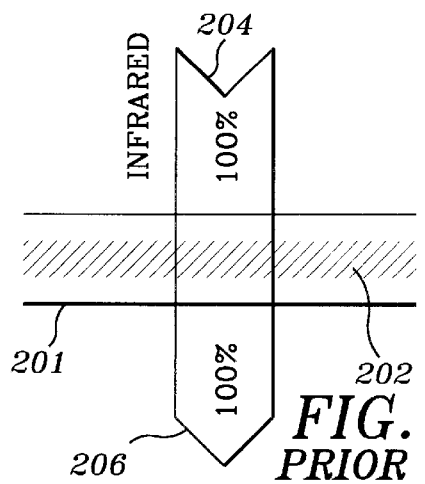
FIGS. 2*a–d* compare visible and infrared transmissions of a film with and without a defect.
Figure 2B:
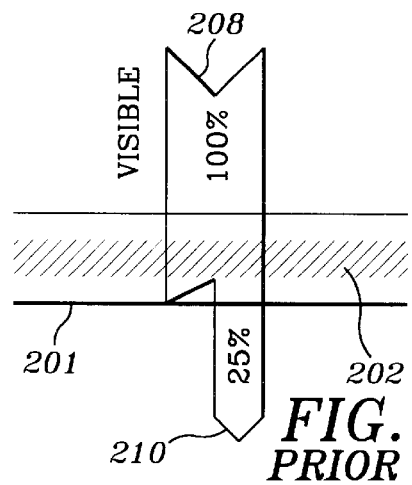
Figure 2C:
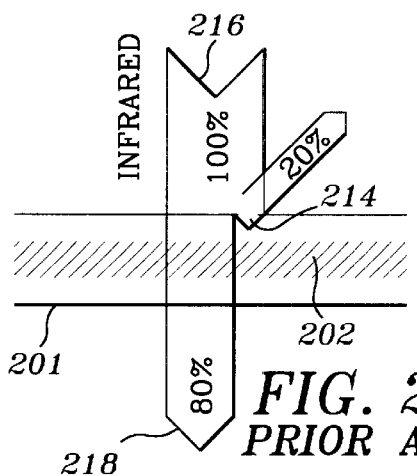
Figure 2D:
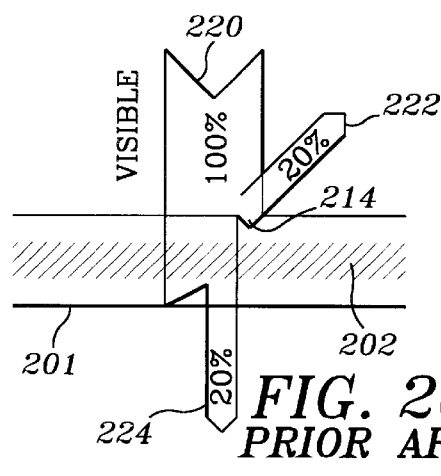
Figure 3:
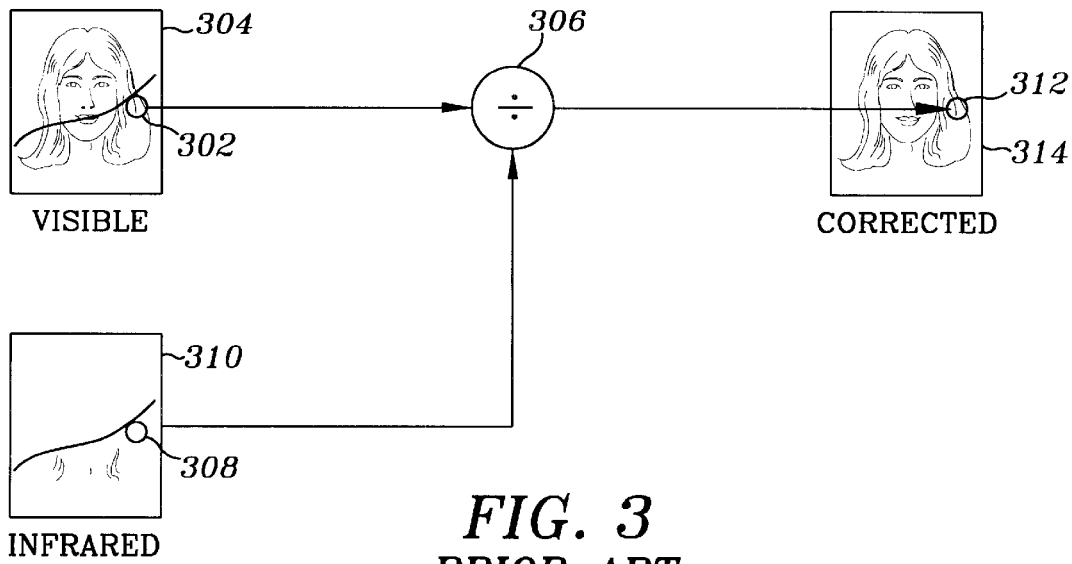
FIG. 3 illustrates an overview of a prior art process for infrared surface defect correction.
Figure 4:
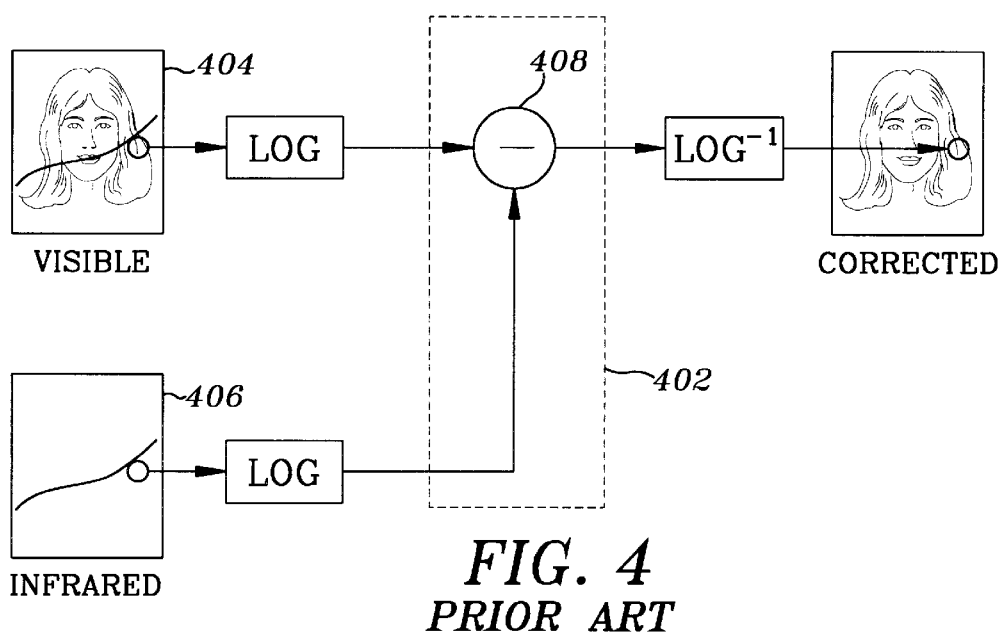
FIG. 4 illustrates a method of surface defect correction applied in logarithmic space.
Figure 5:
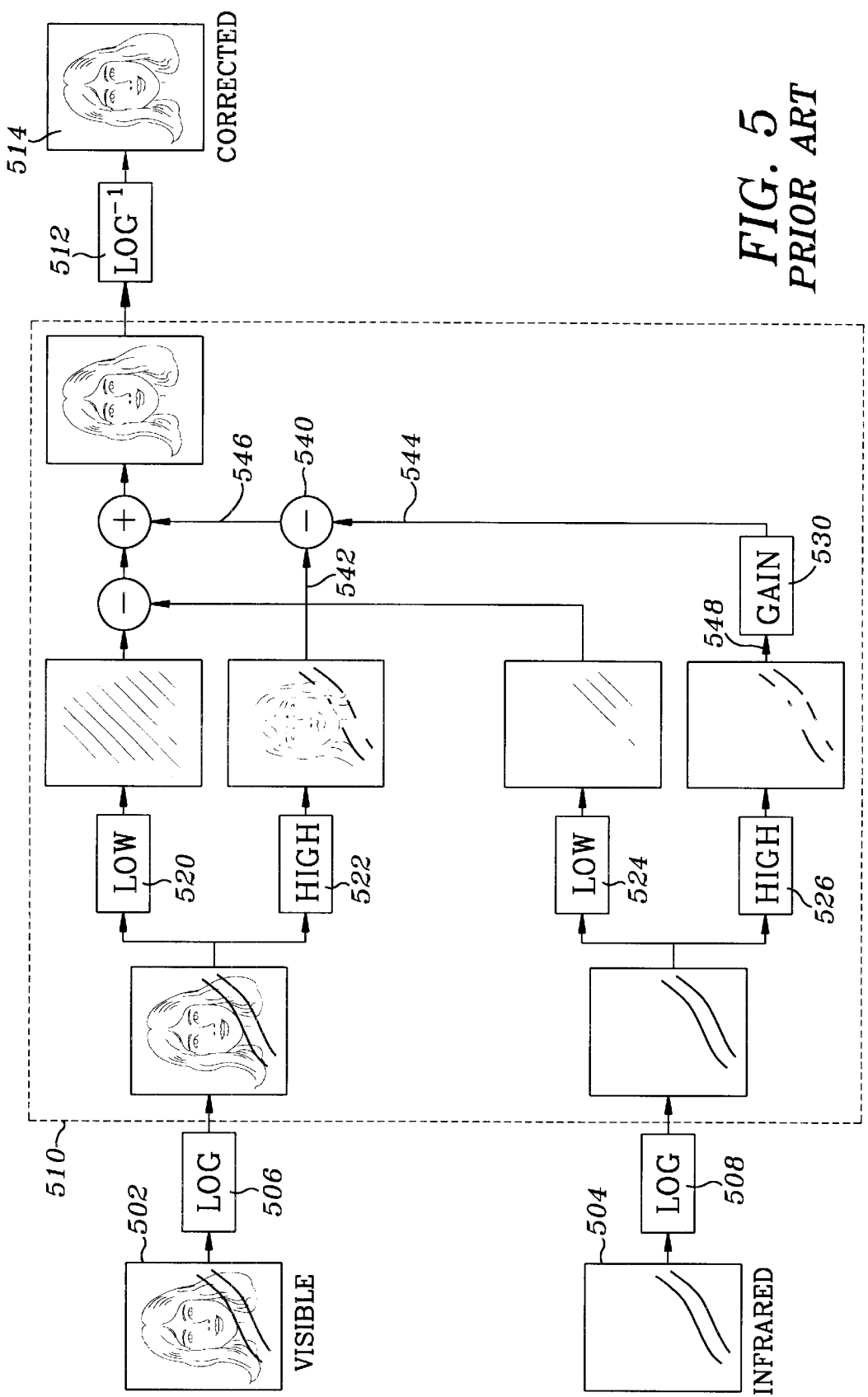
FIG. 5 illustrates a method of surface defect correction applied in split frequency space.

FIG. 6 assumes operation within the logarithmic domain as demarcated by the dotted box 402 of FIG. 4, and further assumes operation on images that have been band passed or high passed as shown previously in FIG. 5 such that the values of the pixels comprising the images average to zero within a region. Because the values of the pixels average to zero, zero is a "base" to which the image can be driven that will always give a reasonable erasure of detail. If the image were not band passed or high passed, setting pixels to zero would produce black dots that would not represent a reasonable erasure of detail.

Further, it should be understood that "zero" is a relative term, and that a fixed bias, or a bias varying with the low frequency of the image, could be introduced, and that setting pixels to "zero" would represent setting them to this bias value. In AC coupled analog electronics, "zero" may or may not represent zero absolute volts, and "zero" is used here in that sense.

Continuing with the description of the preferred embodiment shown in FIG. 6, a pixel 604 from infrared image 606 is processed in conjunction with adjacent pixels by an upper bound function block 608 to estimate, all things considered, what the maximum value for that pixel might be if scanned with an ideal scanner. That maximum value must account for errors in registration, sharpness, and so forth. That maximum value is placed in the upper bound infrared image 610 at pixel 612. Similarly, the same original pixel 604 is processed with adjacent pixels by the lower bound function block 614 to produce a lower bound estimate placed in pixel 616 of the lower bound infrared image 618.

The bounded subtractor function block 602 receives the value of the visible pixel 620 from visible image 622. The upper bound estimate 612 is subtracted from this visible pixel to reduce an upper bound corrected estimate, and the lower bound estimate 616 is subtracted to reduce a lower bound corrected estimate. To the extent the estimators 608 and 614 are operating correctly, the ideal corrected value will lie between the upper and lower bound corrected estimates. An assumption used to select one of the corrected estimates is that if a mistake is made in choosing one estimate, the mistake will be less noticeable if it results in an estimated value closer to zero than if it results in an estimated value farther from zero. Therefore the one of the two upper and lower corrected estimates that is closest to zero is selected as the final estimate. If one estimate is positive and the other negative, and therefore zero is between the two estimates, then zero is output as the final estimate from the bounded subtraction block 602 to place in pixel 626 of the corrected image 628.

Turning now to FIG. 7, the operation and effect of the bounded subtractor are further explained. In FIG. 7, a one-dimensional image is portrayed, which may be a single scan line through a two-dimensional image. It should be understood that the same concepts apply in one or two dimensions.

In FIG. 7a, an infrared defect signal 702 is received from an imperfect scanner. An estimate is made from this defect signal 702 of the range of what might have been received from an ideal scanner. In FIG. 7b, the signal may be higher 704 or lower 706 in magnitude, or may have been further left 708 or right 710. With all this considered, an upper bound 716 (FIG. 7c) and lower bound 718 are found as the limits of the curves 704 to 710.

A perfect visible image signal 720 (FIG. 7d) is contained in the film. Because the film also has a surface defect, the scanned signal 720 received from the scanner approximates the sum of the visible image 720 and the defect signal 702, shown as signal 722 in FIG. 7e. Also copied are the upper and lower bounds of the defect 716 and 718. At position 730, the received visible image 722 is above both the upper and lower bounds 716 and 718, so the greater of the two, the upper bound, is subtracted. At position 732, the received visible image 722 is between the upper and lower bounds, and so the corrected signal is set to zero. The corrected signal 734 (FIG. 7f) is seen to contain the original features of the perfect image 720 inside the film. The bounded subtractor method has, however, reduced the intensity of the details on the assumption that the defect signal is only known within bounds, and it is better to err on the side of a smaller signal than a larger, more noticeable one.

Figure 8:
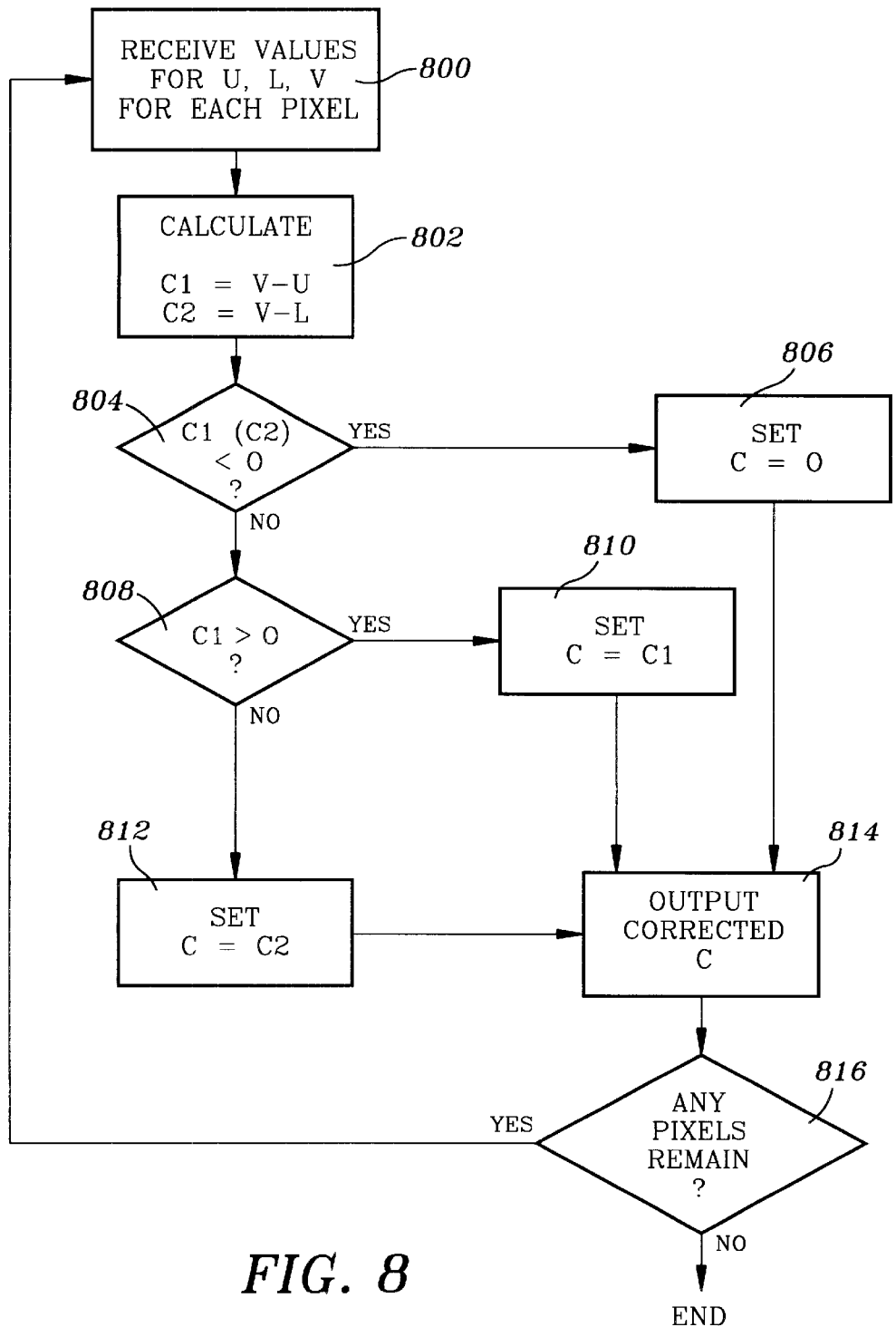
FIG. 8 is a flow chart illustrating details of the present method for accomplishing bounded subtraction.

The bounded subtractor is further described in FIG. 8. In this algorithm, two prototype corrections C1 and C2 are attempted using the upper and lower bounds U and L. If the two prototype corrections C1 and C2 are on opposite sides of zero, which may be tested by asking if their product is negative, then the final correction C is set to zero. If C1 and C2 are on the same side of zero, then both have the same sign. If both are positive, the prototype correction using the upper, biggest bound is used to set the final correction, and otherwise if both are negative, then the prototype correction using the lower, most negative bound will be closer to zero, and is used to set the final correction for the pixel under computation.

At step 800, for each pixel in the image, the upper bound defect pixel value, U, the lower bound defect pixel value, L, and the visible pixel value, V, are received. At step 802, a calculation is made for the values of C1 and C2 using the upper and lower bounds U and L. At step 804, a determination is made as to whether the product of C1 and C2 is less than zero. If the decision is yes, the final correction C is set to zero at step 806. If the decision is no at step 804, a determination is made as to whether the value of C1 is positive. If the decision is yes, the correction C is set to the value of C1 at step 810. If the decision at block 808 is no, the correction value of C is set to the value of C2. The corrected value for C is output at step 814. At step 816 a decision is made as to whether any pixels remain. If remaining pixels are to be analyzed, the program returns to step 800.

As was mentioned earlier, the bounded subtractor assumes the lower frequencies are absent from the signal operated on by the subtractor such that an estimate of zero is the best estimate in the presence of complete uncertainty. An analogy may be drawn to the stock market wherein the best estimate for tomorrow's price is zero change from today's price, not zero price. In the case of infrared surface defect correction, the lower frequencies are separated from the higher frequencies and corrected with a direct subtraction without bounding. The errors made will be minimal because most defects are very local and thus have little effect over a broad region, and in addition, even poor scanners perform well at low frequencies. The low frequency image so corrected is later added to the high frequency image corrected with the bounded subtractor to produce the final corrected image.

Such a frequency division is illustrated in FIG. 9. A signal 902 (FIG. 9a) is received that contains a defect 904. The signal 902 is divided into a low frequency component 906 (FIG. 9b) and a high frequency component 908 (FIG. 9c). The high frequency component 908 may be found by subtracting the low frequency component 906 from the original signal 902. Normally, the low frequency component 906 would be further processed by subtracting the low frequency component of the infrared channel (not shown) from it.

Figure 9A:
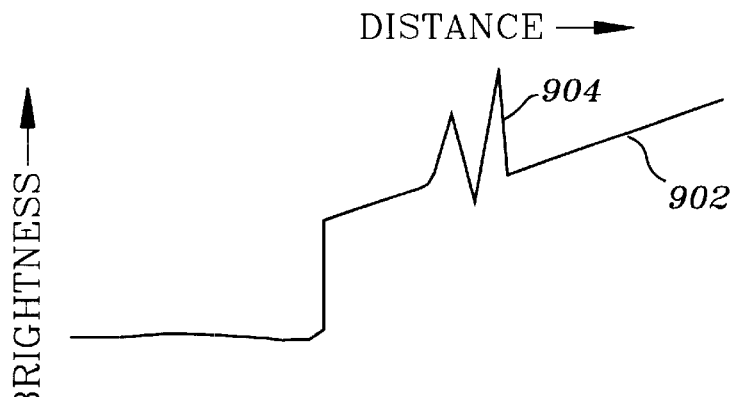
FIG. 9*a–9e* graphically show bounded subtraction applied in split frequency space.
Figure 9B:
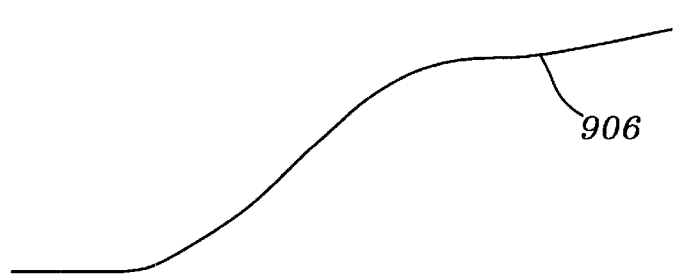
Figure 9C:
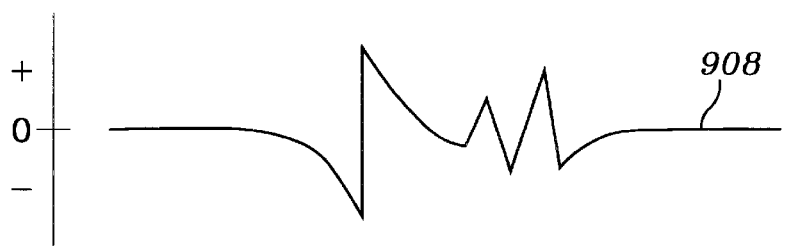
Figure 9D:
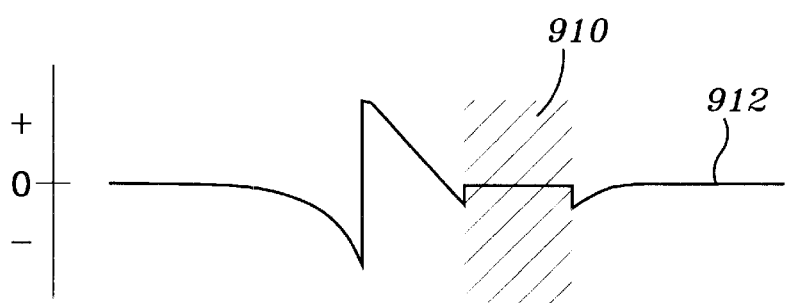
Figure 9E:
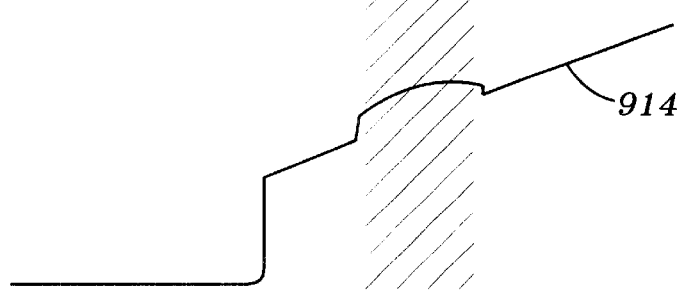

Within a region 910 (FIG. 9d), it is determined that there is a defect, and that the upper and lower bounds are so wide that the best estimate will be just zero. Accordingly, in this region the high frequency signal 908 is simply set to zero to produce the bounded high frequency signal 912. Finally, signals 912 and 906 are added to produce the corrected signal 914 (FIG. 9e). It may be seen that by splitting out the lower frequencies, the zeroing of the higher frequencies has merely muffled the defect, which in the absence of any better estimate, is the best compromise. In practice, the nulling subtractor would work within a narrower range off of zero for a better cancellation of the defect. However, it is illustrated that even in the extreme case of totally zeroing the high frequency signal, the result is reasonable.

Figure 10:
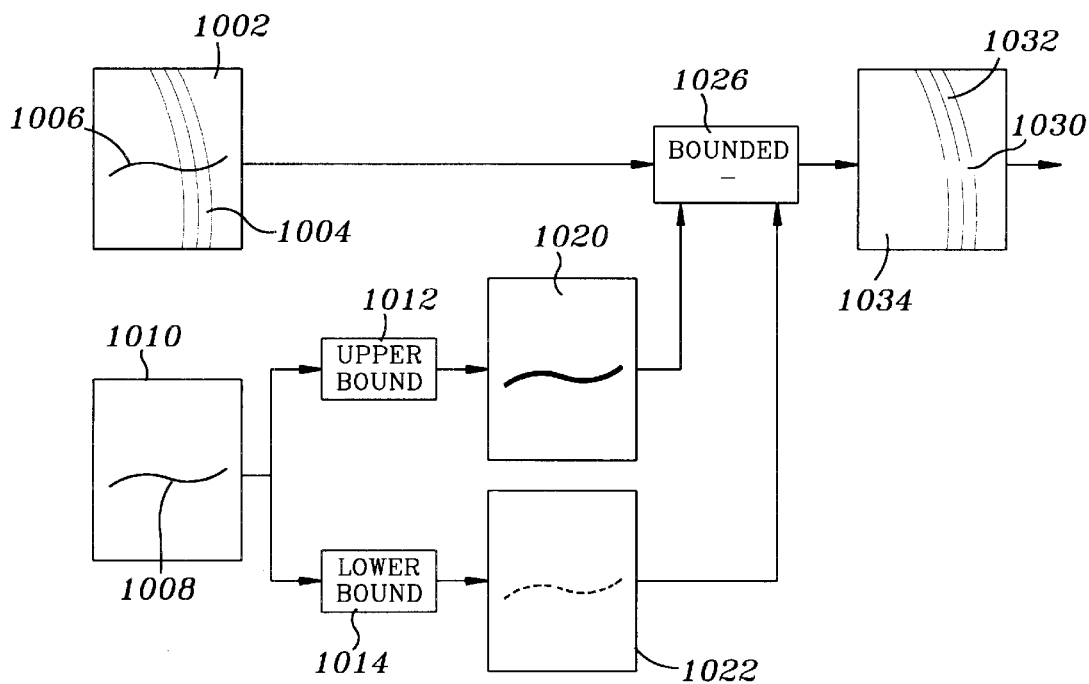
FIG. 10 shows an effect of bounded subtraction in two dimensions.

The bounded subtractor works well at totally eradicating the effects of a defect in a drive to zero; however, a primary limitation of the bounded subtractor as thus far presented is illustrated in FIG. 10. A portion 1002 of a visible image may show strands of Shirley's hair 1004, but in addition show an undesired scratch 1006 on the film. The scratch 1008 also records in the infrared record 1010 of the corresponding portion of the image. The image of the scratch 1008 is processed by the upper and lower bound functions 1012 and 1014 to produce the upper and lower bound corrector images 1020 and 1022 as previously described. These bounds guide the bounded subtractor 1026 to remove the effects of the defect. Depending on the looseness of the bounds set by functional blocks 1012 and 1014, some of the desired image will also be subtracted in an attempt to make sure the defect has been eradicated. The disadvantage of the present method as described thus far is that this overcorrection may leave gaps or smudged spots 1030 in Shirley's hair 1032 of the output portion of the corrected image 1034.

Figure 11:
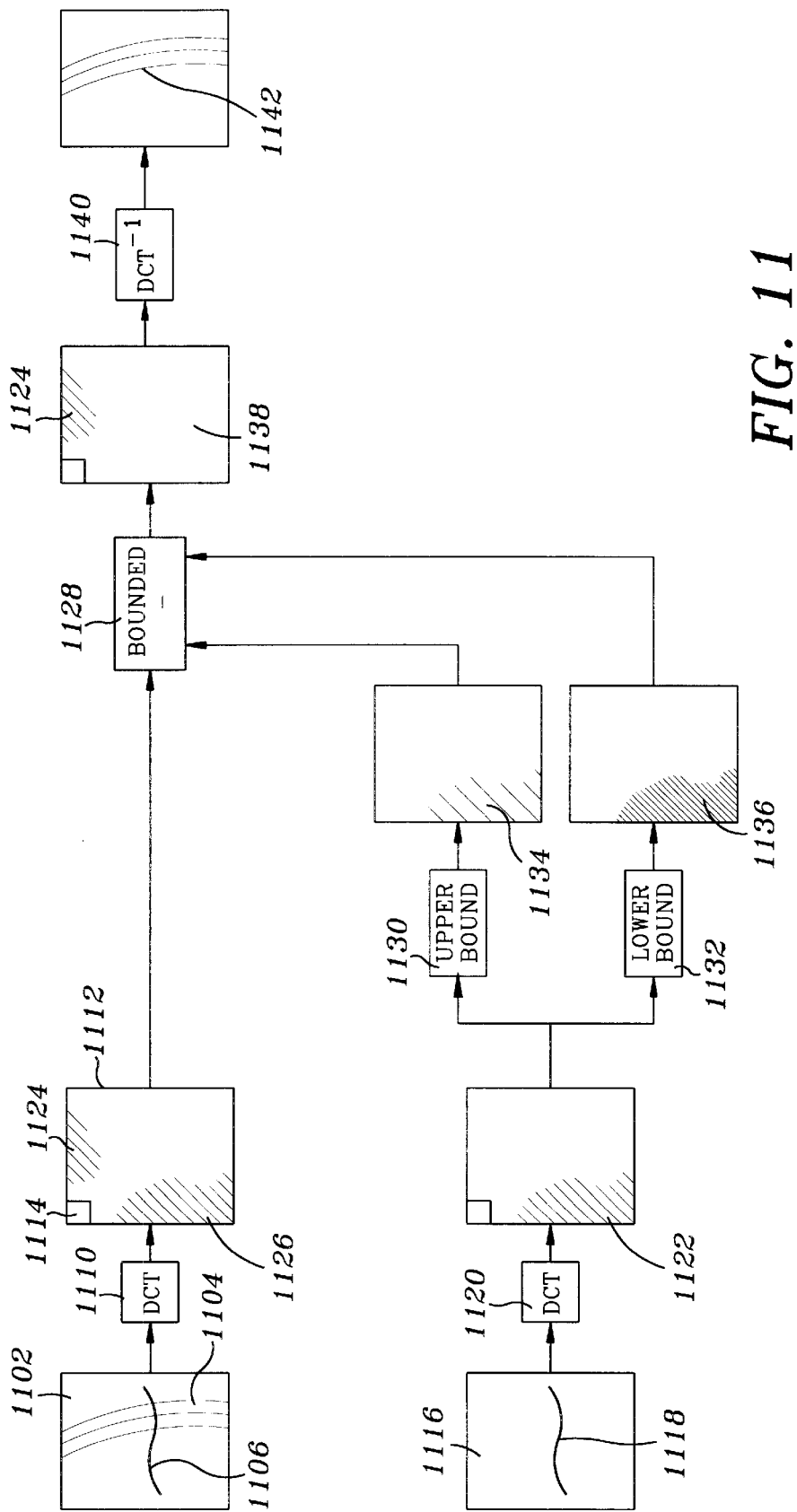
FIG. 11 teaches defect correction applied in transform space.

FIG. 11 teaches defect correction in a transform space so as to eliminate or reduce the problem of overcorrection. A portion of an image is received as block 1102 containing again strands of Shirley's hair 1104 and a defect scratch 1106. The image is assumed to be received in logarithmic space to permit linear processing as described earlier; however, it is not necessary to filter out the lower frequencies as before because the transform will inherently segregate the low frequency components.

A Discrete Cosine Transform, commonly known as a DCT, will be used for illustration and for the preferred embodiment. Algorithms to derive a DCT are very well known in the art as this transform is at the heart of MPEG (Motion Picture Expert Group) and JPEG (Joint Photographic Expert Group) compressions used in image libraries and digital television, and so the derivation of a DCT will not be given here. In addition, there are many other transforms each with its own advantages and disadvantages, and the use of a DCT for illustration should not be considered a limitation. For example, the Fourier Transform will give better discernment of angles compared to the DCT; however, it has problems with boundary conditions. The Hademard Transform has certain computational simplicities.

Turning now to FIG. 11, the visible image portion 1102 is processed in block 1110 by a DCT to produce a visible transformed block 1112. In the preferred embodiment, the image portion 1102 is assumed to consist of 8×8 pixels, and therefore the transform contains 8×8 elements. This is a common size used in many compression algorithms, and is found to work well. It is used in this illustration for convenience, and not by way of limitation. In the DCT, by convention the lowest frequency element is at the top left 1114. This element contains the DC (Direct Current), which is the average of all pixels in the image block 1102. This inherent separation of this low frequency term means that explicit frequency division is not needed in the DCT transform space. Similarly, the infrared image portion 1116 and defect scratch 1118 are processed by a DCT 1120 to produce an infrared transformed block 1122.

Moving to the right from the DC term 1114 are the spectral components 1124 of the vertical strands of hair 1104. Moving down from the DC term 1114 are the spectral components 1126 of the scratch 1106. This simple illustration spotlights the power of a transformer to isolate a defect from image detail by segregating specific details both by frequency and by angle. By operating in transform space, the bounded subtractor 1128 is able to completely subtract out the defect component 1122 between the upper and lower bound functions 1130 and 1132 which produce corrected images 1134 and 1136 without touching the desired image components 1124 at image 1138. After taking the inverse DCT at 1140, the strands of hair 1142 are correctly reproduced with no gaps and no defects. In effect, the image has been smudged along the lines of the image so the smudging is almost unnoticed.

As was mentioned, the preferred embodiment uses a block size of 8×8. A smaller block size will give better discernment based on position but poorer discernment based on frequency and angle, while a larger block will give opposite results. The block size of 8×8 has been found to be an optimum compromise but is not offered as a limitation.

Figure 12:
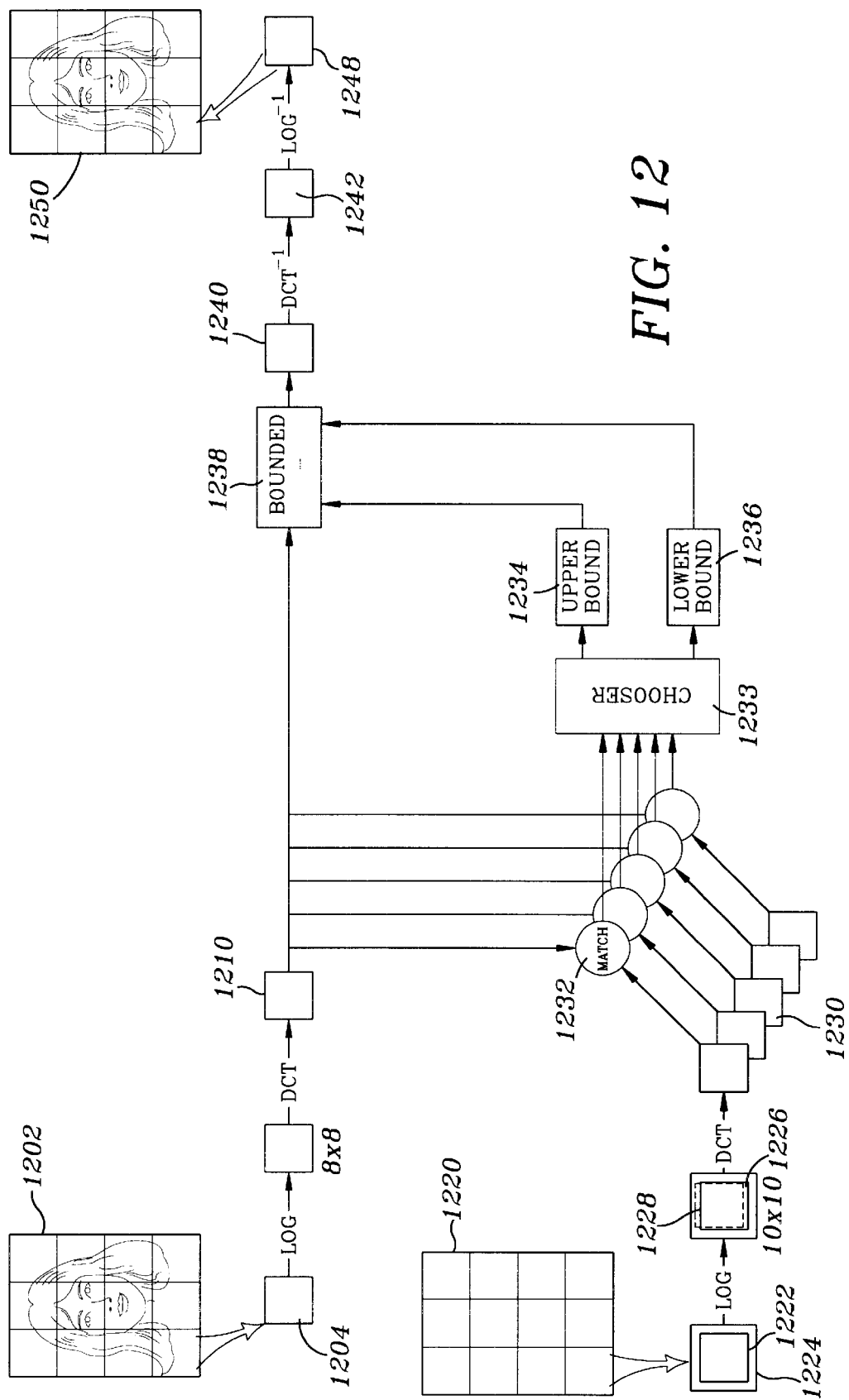
FIG. 12 further details correction in transform space with displacement.

FIG. 12 further describes the details of operation in a transform space. An input visible image 1202 is broken into many blocks, which may be divided into 8×8 pixels as illustrated. These blocks may overlap to reduce boundary effects. A specific block 1204 is selected for correction. The logarithm of each pixel in the block is taken, and the DCT performed on the block to produce the transformed block 1210, as described earlier.

A defect which may occur in some scanners is misregistration of the infrared and visible images. The effects of this can be compensated as is now shown. The infrared image 1220 is also divided into multiple blocks, and the corresponding block 1222 is selected, but a wider area 1224 around the block is utilized. An example would be a 10×10 region. After taking the logarithm of each pixel in the region, several 8×8 regions are selected from this larger 10×10 region. For example, a center region 1226 may be taken, an upper region 1228 shown by the dotted line, a lower region, a left region, and a right region. The DCT is taken on each of these selected regions.

Each of the regions just mentioned produces a suite 1230 of DCT blocks. The perfect correction may be at a fractional pixel of displacement; therefore, none may match exactly, but a subset of these DCT values will give a good estimate. In the illustration, each infrared DCT in the suite 1230 of DCTs is compared with the visible DCT 1210 to test the degree of match using the suite of function blocks 1232. In one embodiment, the three with the best match are used to determine the upper and lower bounds. In another implementation, each is factored in with a weighted average based on the exactness of the match. In any case, this suite 1230 of DCTs is used by function block 1233 to generate an upper and lower bounds 1234 and 1236 for each element of the DCT block, and these bounds used by the bounded subtractor 1238 to generate the corrected DCT block 1240. After taking the inverse DCT to generate block 1242, and the inverse logarithm, the corrected image block 1248 is placed in the output corrected image 1250.

Figure 13:
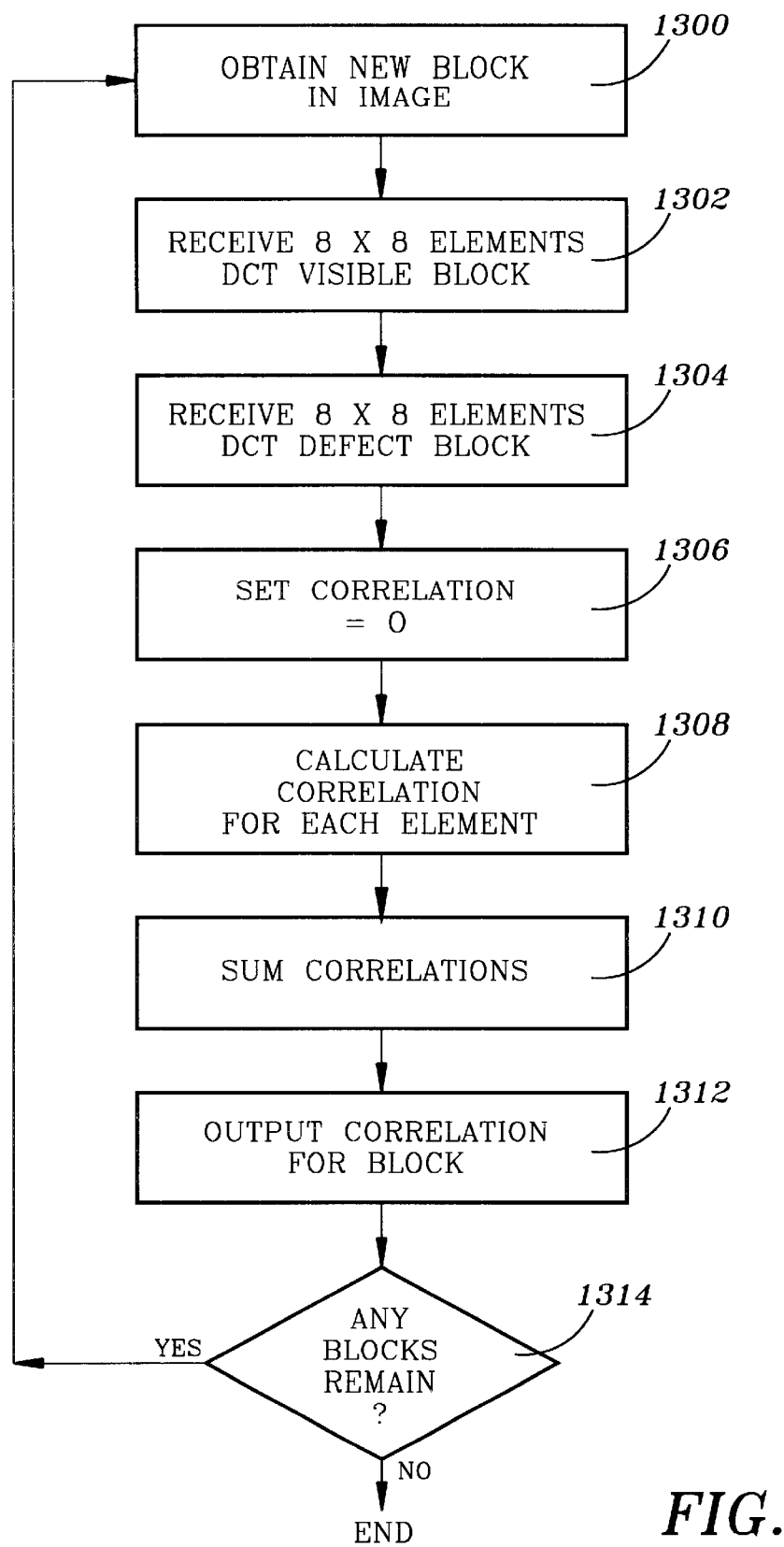
FIG. 13 is a flow chart illustrating the method for obtaining a correlation value.

FIG. 13 teaches how the suite of function blocks 1232 of FIG. 12 may take the correlation. A classic mathematical correlation takes the sum of the products of all terms of the two blocks being correlated. However, in the case of this invention, the visible record may contain very large values induced by image details at lower frequencies, not echoed in the infrared record, that could overpower valid defect details at higher frequencies. FIG. 13 teaches a method of weighting each element with a magnitude corresponding only to the infrared component, which bears the defect detail that will appear in both the infrared and visible images. The multiplication uses only the sign of the visible element with the value for the corresponding defect element. This prevents a huge magnitude of the visible element from overpowering other terms. In an alternate embodiment, the visible and infrared terms are multiplied similar to a classic correlation; however, the visible term is limited in magnitude to be less than or equal to the infrared term magnitude.

Referring again to FIG. 13, an image block is obtained at step 1300. For each block, at step 1302, the 8×8 elements of the DCT visible block are received. At step 1304, the 8×8 elements of the DCT defect block are received. The correlation is initially set to zero at block 1306. For each of the 8×8 elements, a new correlation value is calculated at step 1308. The new correlation is equal to the previous value for the correlation plus the sign of the visible element multiplied by the corresponding defect element. The correlation for each block is output at step 1312. If any blocks remain at Step 1314, a new block is obtained at step 1300. If not, the calculation is completed.

FIG. 14 illustrates graphically a way of calculating the upper and lower bounds. In this figure, only one-dimensional signals are shown for simplicity. These may represent a single row 1402 (FIG. 14a) of a DCT block 1404. The end of this row closest to the DC term 1406 would represent lower frequencies, and the other end would represent higher frequencies. In two-dimensional space, the distance from the DC term 1406 to any specific element would measure the frequency of that element.

As discussed before, the three displaced infrared DCT transforms 1410, 1412, and 1414 (FIG. 14b) with the highest correlations to the visible DCT transform may be received. The range of these three transforms may give an upper and lower bound 1420 and 1422 (FIG. 14c) for each element along the row of the DCT. The DC term may be handled as a special case wherein the upper and lower bounds are set the same, and equal to the average of the DC term of the three blocks. Thus, the DC term is excluded from processing by the bounded subtractor because the DC term represents average brightness and cannot be set toward zero as a default nulling.

Figure 14A:
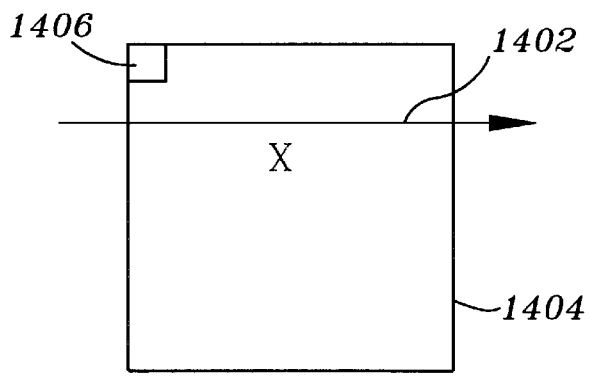
FIGS. 14*a–14e* show graphically the calculation of upper and lower bounds.
Figure 14B:
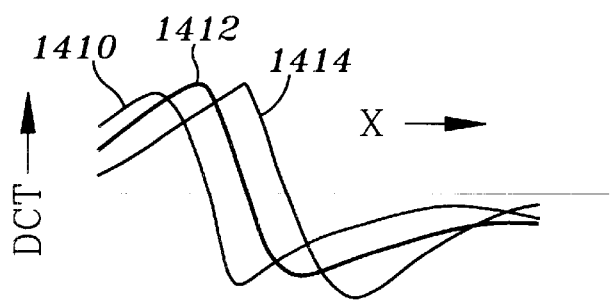
Figure 14C:
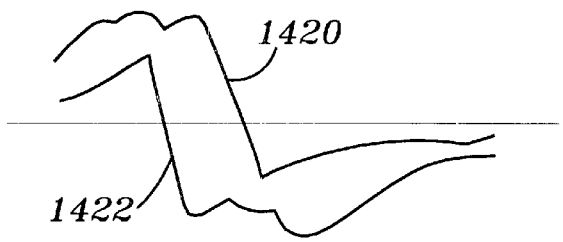
Figure 14D:
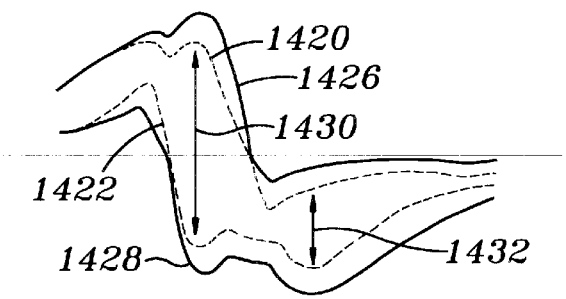
Figure 14E:
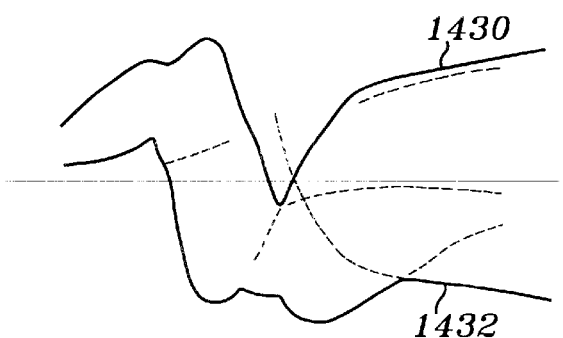

The next step is to extend these bounds, recopied as dotted lines 1420 and 1422 (FIG. 14d) to wider bounds 1426 and 1428 in accordance with expected frequency response rolloff and variations in the actual scanner versus an ideal scanner. In a region 1430 wherein the upper and lower bounds are on opposite sides of zero, both would be multiplied by a constant greater than one that may be called "upper extend" in order to pull the curves 1426 and 1428 further apart by pushing them both away from zero. Conversely, in a region 1432 wherein the upper and lower bounds are on the same side of zero, the one closest to zero would need to be multiplied by a second constant less than one that may be called "lower extend" in order again to pull the curves farther apart, this time by pulling the one closest to zero toward zero, as shown in FIG. 14e. A typical value for "upper extend" is 1.5, and a typical value for "lower extend" is 0.5.

The constants "upper extend" and "lower extend" are typically constants that are dependent on frequency, and may vary from equality at the DC term to widely divergent values at the highest frequency farthest from the DC term. In this case, "upper extend" may vary linearly for 1.0 at DC to 2.0 at highest frequency terms farthest from DC, and "lower extend" may vary linearly from 1.0 at DC to 0.0 at the highest frequency terms. Also, the constants "upper extend" and "lower extend" are typically greater and less than unity respectively, but they do not need to be. For example, if it is known that a scanner responds at a particular frequency with only 50% modulation in the infrared spectrum as compared to the visible spectrum, then both upper and lower extends could be multiplied by 1/50%=2 to compensate, which may make the lower extend greater than unity.

Finally, some scanners do not respond effectively to the higher frequency details in the infrared range, and with these scanners it is necessary to use the lower frequency details in the infrared spectrum to predict a range to correct in the high frequencies. In effect, the high frequencies simply get smudged in proportion to the defect content in the lower frequencies.

To practice this high frequency smudging, the average content of lower frequency defects is found by averaging the absolute value of lower frequency elements of the infrared DCT. This value is used to set upper and lower bounds 1426 and 1428 below which the final bounds 1426 and 1428 below which the final bounds are not allowed to fall. Conversely, the new range extensions 1430 and 1432 can be added to the upper and lower bounds 1426 and 1428 which for such scanners presumably approach zero at high spatial frequencies in the infrared.

Figure 15:
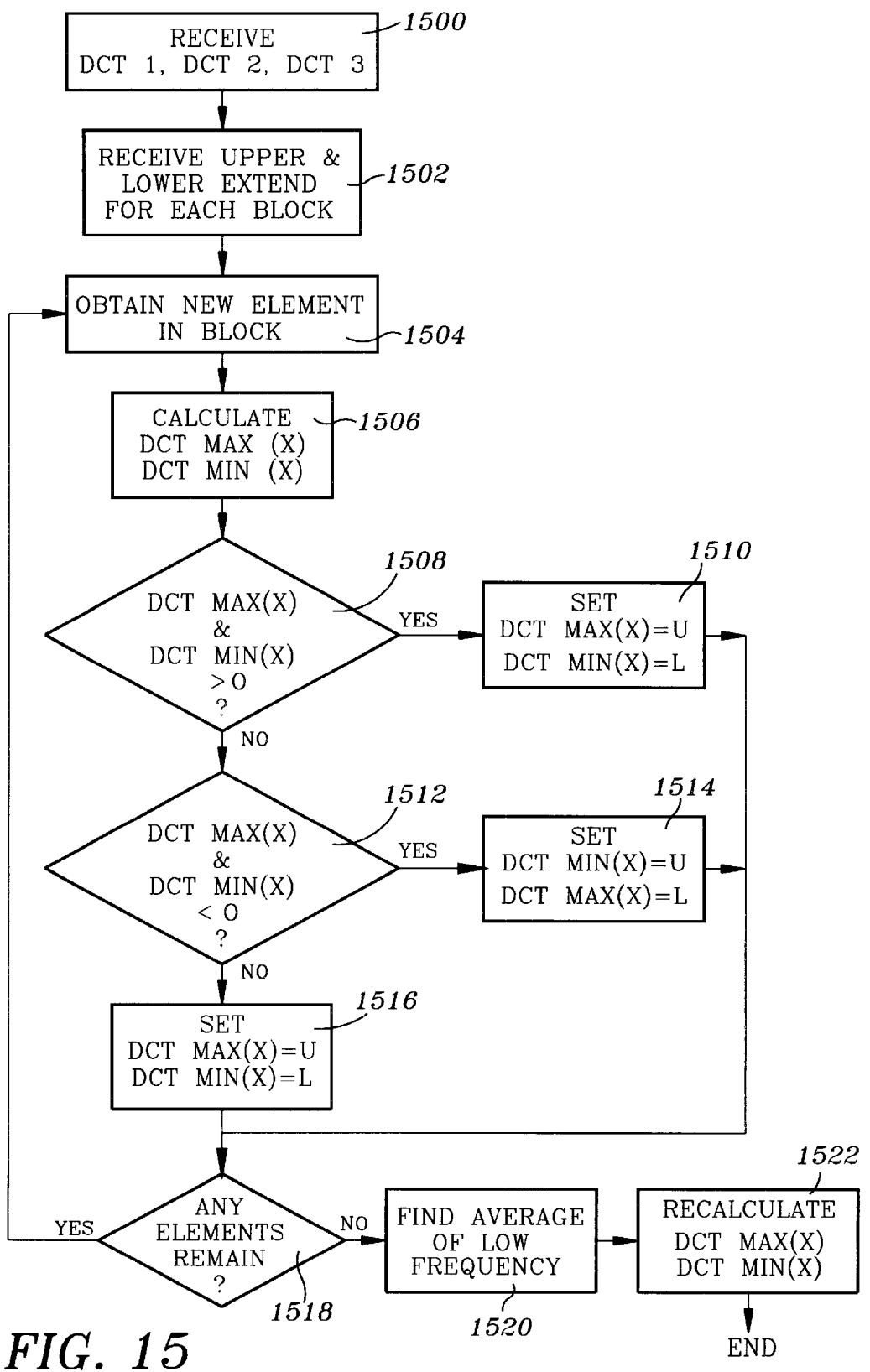
FIG. 15 is a flow chart illustrating the method for obtaining the upper and lower bounds.

FIG. 15 is a block diagram of the teachings of FIG. 14. At step 1500, the three offset defects DCT's with highest correlation to visible DCT are obtained as values DCT 1, DCT2, and DCT3. The upper and lower extends for each block are received at step 1502. A new element in the block is obtained at step 1504. For each element, x, of the 8×8 elements, a calculation is made at step 1506 to calculate DCT Max (x), and DCT Min (x). DCT Max (x) is equal to the maximum of DCT 1(x), DCT 2(x), and DCT 3(x). DCT Min (x) is equal to the minimum of DCT 1(x), DCT 2(x), and DCT 3(x). At step 1508, a decision is made as to whether both DCT Max (x) and DCT Min (x) is positive. If the decision is yes, at step 1510, DCT Max (x) is set to the upper extend (x), U. DCT Min (x) is set to the lower extend (x), L. If the decision at step 1508 is no, a decision is made at step 1512 to determine whether both DCT Max (x) and DCT Min (x) is negative. If the decision is yes, at step 1514, DCT Min (x) is set to the upper extend (x), U. DCT Max (x) is set to the lower extend (x), L. If the decision at step 1512 is no, meaning that DCT Max (x) and DCT Min (x) are of opposite signs, DCT Max (x) is set to the upper extend (x), U and DCT Min (x) is set to the lower extend (x), L. A decision is then made at step 1518 to determine if there are any elements remaining to be analyzed. If the decision is yes, the process continues with step 1504. If the decision is no, the average of the lower frequency elements excluding DC, for each high frequency element x is calculated. DCT Max (x) is then recalculated at step 1522 as the maximum of DCT Max (x) and a positive constant times the lower frequencies. DCT Min (x) is recalculated at step 1522 as equal to the minimum of DCT Min (x) and a negative constant times the average of the lower frequencies.

Whereas the present invention has been described with respect to specific embodiments thereof, it will be understood that various changes and modifications will be suggested to one skilled in the art, and it is intended to encompass to such changes and modifications as fall within the scope of the appended claims.

What is claimed is:

1. A method for removing the effects of defects from an image comprising:
   receiving a defective first image including a plurality of pixels, each having an intensity value;
   receiving a defect image of defects in the first image including a plurality of pixels, each having an intensity value and a correspondence to the first image pixels;
   selecting an element of the first image comprising a select pixel of the first image and a corresponding pixel of the defect image;
   determining an upper bound for the element as a function of the defect image;
   determining a lower bound for the element as a function of the defect image; and
   correcting the first image as a function of the upper and lower bound.

2. The method as recited in claim 1, further including the steps of filtering the first image and filtering the second image.

3. The method as recited in claim 2, wherein the steps of filtering includes passing all high frequencies.

4. The method as recited in claim 2, wherein filtering is further refined to distinguish spatial frequencies.

5. The method as recited in claim 4, wherein a first region is defined to include a plurality of pixels of the first image and a corresponding plurality of the pixels of the defect image, and further comprising the steps of
   applying a transform to the plurality of pixels from the first image to generate a plurality of elements from the transform distinguishing spatial frequency and angle; and
   applying the transform to the plurality of pixels from the defect image to generate a plurality of defect elements from the transform distinguishing spatial frequency and angle.

6. The method as recited in claim 5, wherein the transform is a DCT (discrete cosine transform).

7. The method as recited in claim 5, wherein the transform is a Fourier transform.

8. The method as recited in claim 5, wherein a second region is defined that partially overlaps the first region.

9. The method as recited in claim 1, wherein the upper bound for the element is determined by multiplying the corresponding defect element by a constant.

10. The method as recited in claim 9, wherein the constant is greater than 1.0.

11. The method as recited in claim 9, wherein the lower bound for the elements is determined by multiplying the corresponding defect element by a second constant.

12. The method as recited in claim 11, wherein the second constant is between 0 and 1.0.

13. The method as recited in claim 5, wherein the upper bound for the corresponding defect element is determined by multiplying the magnitude of the defect element by a function of the spatial frequency of the corresponding element.

14. The method as recited in claim 13, wherein the function is near unity for low frequencies and rises with increasing frequency.

15. The method as recited in claim 13, wherein the lower bound for the corresponding defect element is determined by multiplying the magnitude of the defect element by a second function of the spatial frequency of the corresponding element.

16. The method as recited in claim 15, wherein the second function is near unity at low frequencies and decreases at higher frequencies.

17. The method as recited in claim 1, wherein the upper bound is a function of the select pixel of the defect image and another pixel adjacent to the select pixel.

18. The method as recited in claim 17, wherein the function includes finding the maximum of the select pixel and the adjacent pixel.

19. The method as recited in claim 1, wherein the lower bound is a function of the select pixel of the defect image and another pixel adjacent to the select pixel.

20. The method as recited in claim 19, wherein the function includes finding the minimum of the select pixel and the adjacent pixel.

21. The method as recited in claim 5, wherein a second region is defined to include a second plurality of pixels from the defect image that is offset from the first region by substantially the dimensions of an adjacent pixel, applying the transform to the second plurality of pixels to generate a second plurality of defect elements from the transform, and wherein the function determining the upper bound for the element is further characterized as comprising the step of finding the maximum of the corresponding defect element from the transform and corresponding second defect element from the second transform.

22. The method as recited in claim 21, wherein the spatial direction of offset of the second region is selected such that the correlation of the second plurality of defect elements to the plurality of elements generated from the first image is maximized.

23. The method as recited in claim 1, wherein the bounding function is further defined to comprise the steps of selecting a ratio of the upper and lower bounds, adding the upper and lower bounds in proportion to the ratio to produce a blended bound;

subtracting the blended bound from the corresponding element of the first image to produce a corrected element; and adjusting the ratio such that the magnitude of the element of the corrected image is minimized.

24. The method as recited in claim 23, wherein adjusting the ratio is performed by the steps of subtracting the upper bound from the corresponding element of the first image to produce a first candidate correction;

subtracting the lower bound from the corresponding element of the second image to produce a second candidate correction;

producing a corrected element of substantially 0 if the first and second candidate corrections are of opposite sign, and a corrected element corresponding to the one of the first and second candidate corrections that is smallest in magnitude if the first and second candidate corrections are of the same sign.

* * * * *